United States Patent [19]

Jesswein

[11] 4,210,405
[45] Jul. 1, 1980

[54] PIVOT JOINT

[75] Inventor: Ronald M. Jesswein, Buchanan, Mich.

[73] Assignee: Clark Equipment Company, Buchanan, Mich.

[21] Appl. No.: 962,450

[22] Filed: Nov. 20, 1978

[51] Int. Cl.² ............................................. F16J 15/00
[52] U.S. Cl. .................................... 403/158; 403/288; 277/29
[58] Field of Search .................... 277/29; 251/DIG. 1; 403/288, 157, 158, 150, 151

[56] References Cited

U.S. PATENT DOCUMENTS

| 2,711,352 | 6/1955 | Hasko | 308/72 |
| 3,901,434 | 8/1975 | Wright | 277/29 X |
| 3,951,381 | 4/1976 | Whitener | 251/DIG. 1 |

Primary Examiner—Andrew V. Kundrat
Attorney, Agent, or Firm—Kenneth C. Witt

[57] ABSTRACT

A pivot joint having an elastomeric sealing member between a pivot pin and a surrounding structure, including means for preventing the sealing member from extruding between the pivot pin and surrounding structure when lubricant is inserted into the joint under pressure.

10 Claims, 18 Drawing Figures

PIVOT JOINT

BACKGROUND OF THE INVENTION

1. Field of the invention

This invention relates to pivot joints of the type used in vehicles and in other machinery in which parts are connected together for pivotal movement.

2. Description of the Prior art

An example of the use of such pivot joints is found in bucket loader vehicles of both the wheel and crawler types. In such machines a loader bucket is carried at the outer end of a boom arm structure which can be pivoted upwardly and downwardly among digging, carrying and dumping positions. A linkage mechanism is provided as a part of the boom arm structure for pivoting the bucket on the boom arm mechanism to move it to different operating positions. An example of such a boom arm structure and linkage is shown in U.S. Pat. No. 3,867,750 Den Bleyker, dated Feb. 25, 1975.

Such a linkage mechanism comprises various cranks, links and actuators which are pivotally connected. In such usage it is important to have pivot joints which are rugged and long lasting and which can be properly lubricated to aid in insuring adequate life. It is important also in many cases to provide pivot joints which exclude dirt and other foreign matter as much as possible because such machines frequently operate in adverse environments.

It is known to utilize elastomeric sealing members in such pivot joints to assist in retaining the lubricant in the joint and also in excluding dirt and foreign matter. However, there have been problems with such sealing members and one of the principal problems is a tendency for such a sealing member to extrude from the pivot joint between the pivot pin and the surrounding structure when lubricant is inserted into the joint under pressure. In this context "to extrude" means that the elastomeric sealing member is forced out of its correct sealing position either wholly or in part.

One solution which has been tried heretofore in an attempt to solve the problem of extruding elastomeric sealing members is the use of a pressure relief valve in association with or as a part of the fitting through which lubricant is inserted into the pivot joint. This arrangement has the disadvantage, however, that the pressure limiting feature is at the inlet to the pivot joint, and limiting the pressure at this location may prevent proper lubrication of the pivot joint because there is not sufficient pressure available in the pivot joint to force the lubricant all the way to the most remote portions of the joint.

The present invention solves, or at least greatly alleviates the problem of extruding the sealing members when a pivot joint is being lubricated while at the same time assuring that lubricant does reach all essential portions of the joint.

SUMMARY OF THE INVENTION

A pivot joint comprising a pivot pin and a surrounding outer structure, an elastomeric sealing member carried by the outer structure and in contact with the pivot pin, and including an arrangement providing relief for the elastomeric sealing member to prevent its extrusion from the joint when lubricant is inserted.

DESCRIPTION OF PREFERRED EMBODIMENTS

Figure 1:
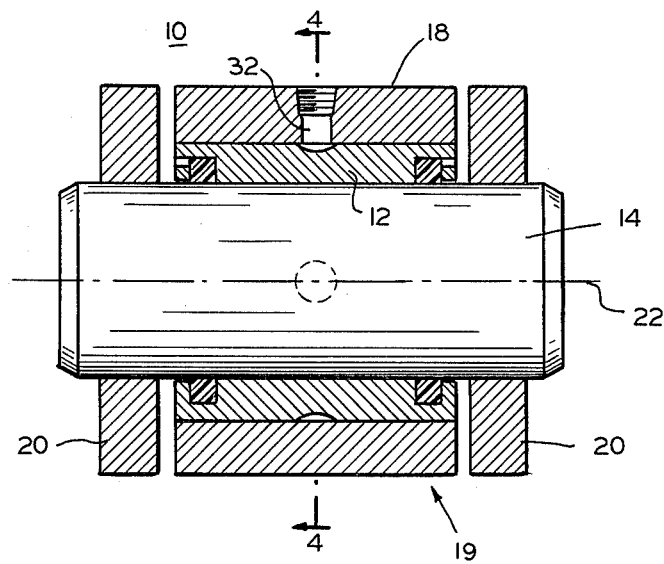
FIG. 1 is a longitudinal sectional view through a pivot joint embodying the present invention.

FIG. 1 of the drawing shows a pivot joint 10 embodying the present invention, such pivot joint including an elongated annular bushing 12 which houses elongated pivot pin 14 within the opening 16 through the bushing 12. See FIG. 2 for opening 16. The bushing 12 is retained within an outer member 18, the two jointly forming an outer structure indicated by the character 19. Pin 14 is secured to member 20 which may be a bifurcated or double member rigidly connected to pin 14 adjacent the respective ends of the pin.

In operation the member 20 and pin 14 are turned relative to outer structure 19 about axis 22 to provide a pivot connection between members 18 and 20. It will be understood that the bearing surfaces are the inner surface 13 of bushing 12 and the outer surface 15 (see FIG. 3) of pin 14.

Figure 2:
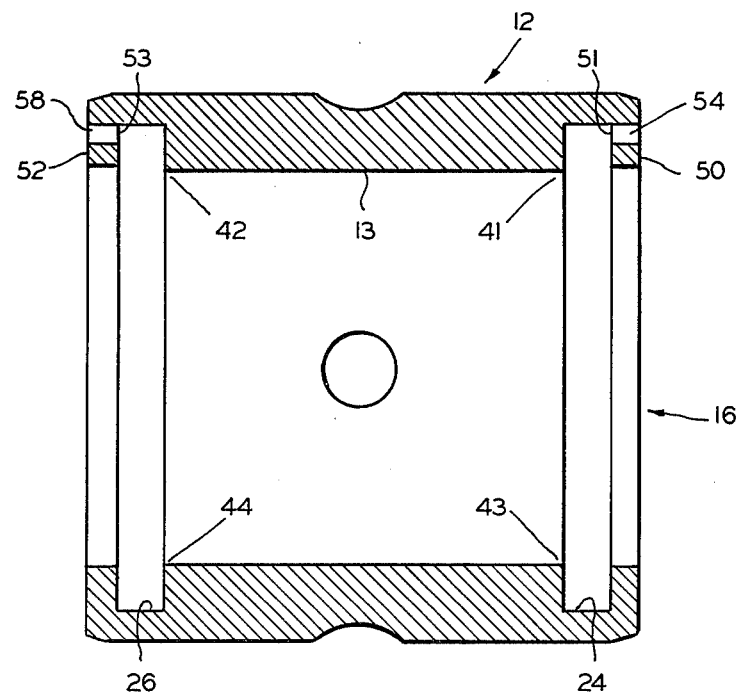
FIG. 2 is a sectional view along the same plane showing the bushing only of the FIG. 1 embodiment of the invention.

As shown in FIG. 2, the bushing 12 has two inward grooves 24 and 26 adjacent the right and left ends of the bushing as shown in this figure. As illustrated, these grooves are rectangular in section.

Figure 3:
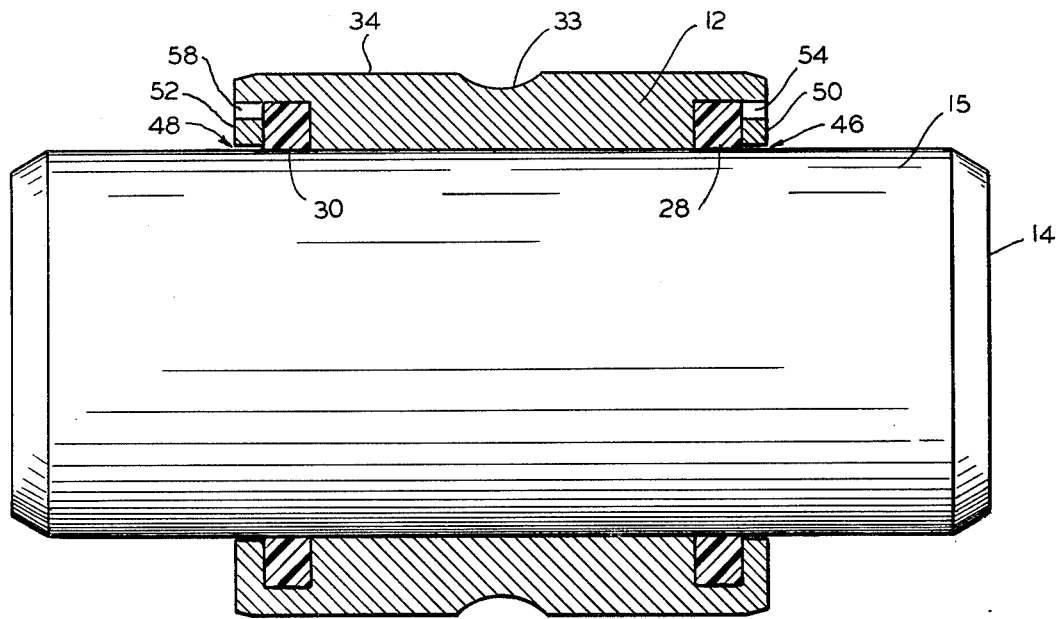
FIG. 3 is an enlarged view showing a portion of FIG. 1.

As shown in FIG. 3, the grooves 24 and 26 contain elastomeric sealing members 28 and 30 respectively in the complete assembly embodying the invention. Each of the elastomeric sealing members is annular and each is also rectangular in section and occupies most of the respective groove in the bushing 12, with the inner surface of each sealing member being in contact with the outer cylindrical surface 15 on pin 14 to provide a seal to retain lubricant within the joint and tend to prevent the entry of dirt and other foreign material from outside.

Figure 4:
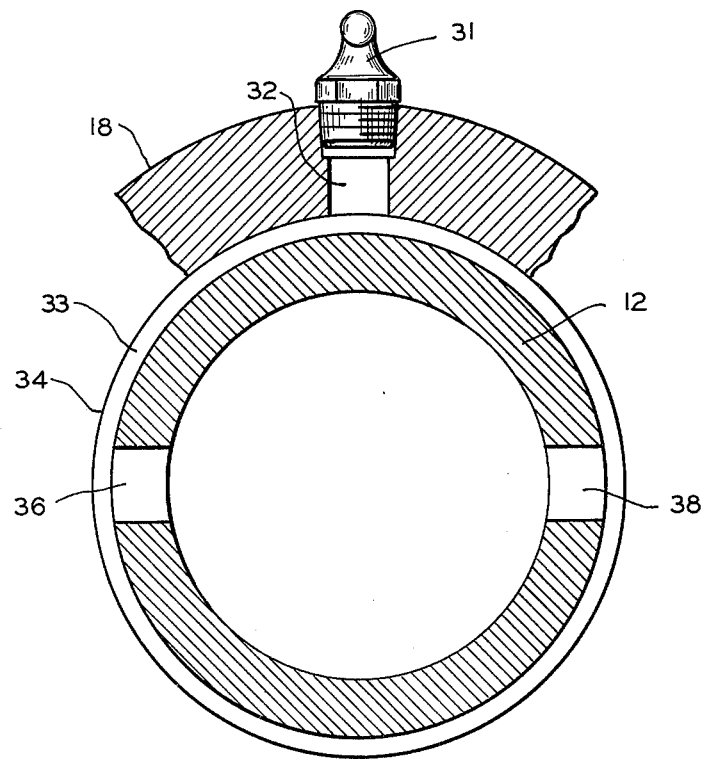
FIG. 4 is a fragmentary view along the line 4—4 of FIG. 1.

While it is not apparent from the drawing, because of the small scale, it is possible to insert lubricant into the joint between the inner surface 13 of bushing 12 and the outer surface 15 of the pivot pin 14. This is carried out in a typical pivot joint by inserting grease through a pressure fitting 31 which appears in FIG. 4 from which the lubricant passes through opening 32 in member 18 from where it passes through outer circumferential groove 33 in the outer surface 34 of bushing 12. The lubricant moves circumferentially around bushing 12 in groove 33 about a quarter of the circumference in both directions and enters the space between bushing 12 and pin 14 through openings 36 and 38 through bushing 12. After the lubricant enters the joint between bushing 12 and pin 14 it then flows to remote parts of the joint, such as the locations indicated generally at 41, 42, 43 and 44 in FIG. 2. Experience has shown that under such circumstances in prior art pivot joints of the present type the sealing members 28 and 30 are likely to be extruded from the pivot joint through the annular spaces or diametral clearances 46 and 48 indicated in FIG. 3 between the inwardly extending flange portions 50 and 52 of the bushing 12 and the outer surface 15 of pivot pin 14.

Figure 5:
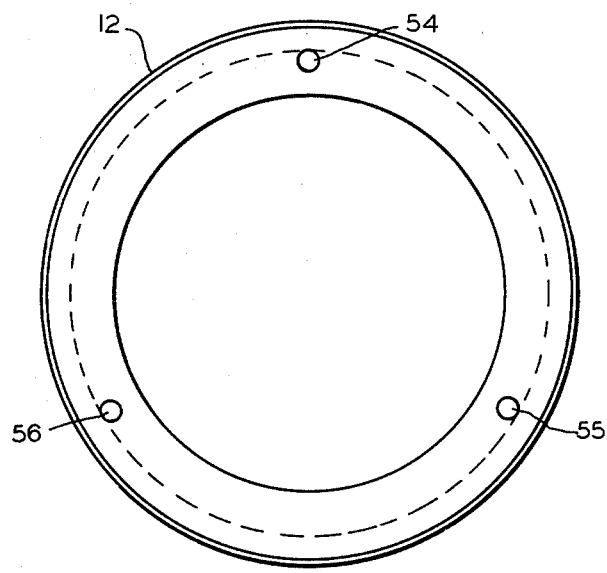
FIG. 5 is an end view of the bushing of FIG. 2.

I have discovered that the problem of sealing members thus being extruded can be alleviated to a considerable extent by providing relief openings such as 54 and 58 extending from the grooves 24 and 26 containing the respective sealing members outwardly to the atmosphere. As shown in FIGS. 2, 3, and 5 openings 54 and 58 are circular axial openings extending from the inner surfaces 51 and 53 respectively of the flange portions 50 and 52 through such flange portions, that is, they extend from grooves 24 and 26 respectively to the atmosphere outside the pivot joint.

It is important that the relief openings extend to or closely adjacent the outer diameters of the grooves 24 and 26 and their respective sealing members, and in the first embodiment illustrated the outer limit of opening 54 is aligned with the outer diameter of groove 24 and the outer limit of opening 58 is aligned with the outer diameter of groove 26, as shown in FIG. 2.

I have discovered that it is necessary to have only a single relief opening for each of the grooves and its respective elastomeric sealing member in order to overcome to a considerable extent the problem of extruding the sealing members from the pivot joint when lubricant is inserted. However, more than one opening is preferred because multiple openings provide a more uniform distribution of pressure and lubricant within the pivot joint when lubricant is inserted. Also, if there are multiple openings the joint will function adequately even though one relief opening is obstructed. In the preferred mode three equally spaced relief openings are utilized as indicated at 54, 55, and 56 in FIG. 5 which is an end view of the bushing of FIG. 2.

Figure 6:
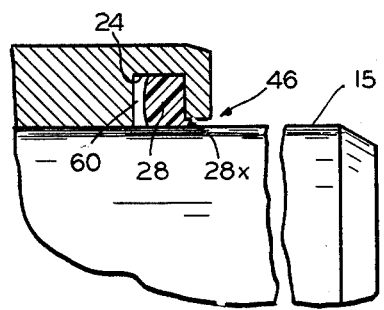
FIG. 6 illustrates a prior art seal construction.
Figure 7:
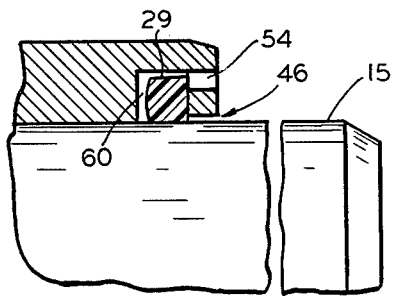
FIG. 7 illustrates the manner in which the sealing member behaves in the present construction.

FIG. 6 of the drawing illustrates the partial extrusion of a sealing member in a pivot joint construction according to the prior art. FIG. 7 shows the construction of the present invention and illustrates the manner in which the sealing member functions to avoid such extrusion. FIG. 6 is a fragmentary view of a portion of a pivot joint which is the same as the present invention except that the relief opening has been omitted. In this situation when lubricant is inserted in the joint under pressure the sealing member 28 may be compressed as indicated toward the right with lubricant occupying the space 60 along the left edge of groove 24. A small portion 28x of the sealing member 28 is shown extruded into the opening 46. If sufficient pressure is applied to the lubricant a larger portion of the circular sealing member 28 may be extruded out through opening 46, breaking the seal between sealing member 28 and surface 15 and allowing the egress of lubricant and the entry of dirt and other foreign materials into the pivot joint.

FIG. 7 illustrates the manner in which the sealing member functions to avoid extrusion of the sealing member and the breaking of the seal in accordance with this invention. In FIG. 7 when a similar pressure is applied to the lubricant a chamber 60 forms at the left similarly to FIG. 6, and it is filled with lubricant. However, in this instance, because of the relief opening 54, the outer margin 29 of the sealing member collapses sufficiently, as shown, to allow the discharge of lubricant from the pivot joint through relief opening 54 to the atmosphere, thus preventing extrusion of the sealing member 28 through opening 46. This invention provides good distribution of the lubricant in the pivot joint particularly when multiple relief openings are used. It facilitates the lubrication of pivot joints which embody this invention because the person applying the lubricant merely watches the exterior of the pivot joint while the lubricant is being applied, and when some lubricant has been discharged through one or more of the relief openings he knows the pivot joint is adequately lubricated.

Figure 8:
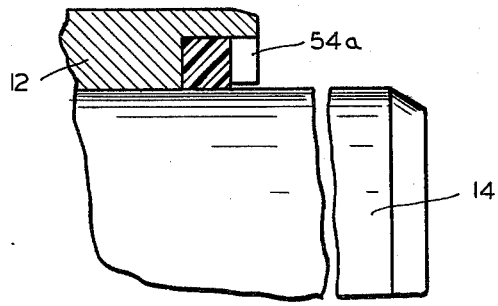
FIG. 8 is a fragmentary view of the upper right portion of FIG. 3 showing a second embodiment of the invention.
Figure 8A:
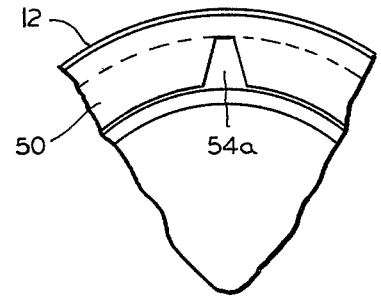
FIG. 8A is an end view of FIG. 8.

It will be appreciated that other arrangements than that illustrated in FIGS. 2, 3, 4, and 5 can be utilized pursuant to the present invention. For example, relief openings such as 54a illustrated in FIGS. 8 and 8A may be utilized. Opening 54a extends axially through flange portion 50 of the bushing 12 in the same manner as opening 54 of the first embodiment; it differs in that opening 54a breaks the inner cylindrical surface of flange portion 50 and extends outwardly. Opening 54a is trapezoidal in section.

Figure 9:
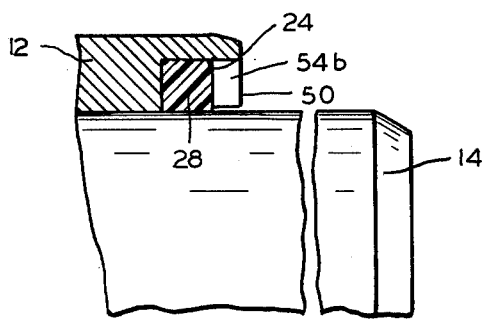
FIG. 9 is a fragmentary view of the same portion of the pivot pin as FIG. 8 but showing a third embodiment of the invention.
Figure 9A:
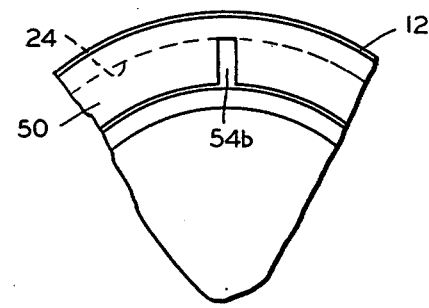
FIG. 9A is an end view of FIG. 9.

FIGS. 9 and 9A illustrate another configuration which may be utilized for the relief opening. Such an opening is indicated at 54b and differs from opening 54a in that it is rectangular in section and extends from the inner cylindrical surface of the flange portion 50 to the outer diameter of the respective groove 24 as illustrated in FIG. 9.

Figure 10:
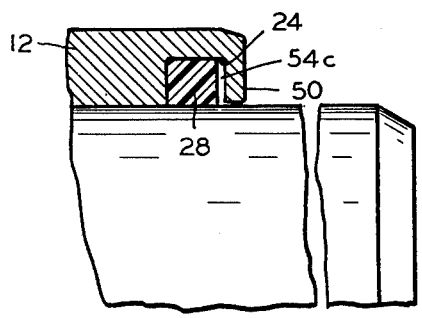
FIG. 10 is a fragmentary view of the same portion of the pivot pin as FIG. 8 but showing a fourth embodiment of the invention.
Figure 10A:
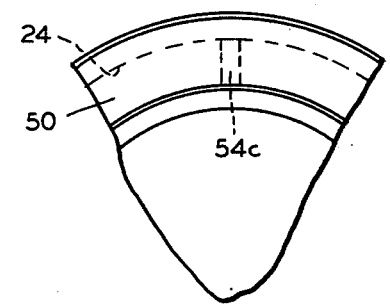
FIG. 10A is an end view of FIG. 10.

In FIGS. 10 and 10A groove 54c is shown as the relief opening for the right hand sealing member 28. Groove 54c is in the surface 51 (see FIG. 2) of flange portion 50 and extends radially from the inner cylindrical surface of such flange portion to the outer diameter of the groove 24.

Figure 11:
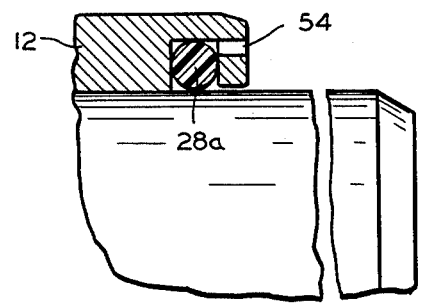
FIG. 11 is a fragmentary view showing a fifth embodiment.
Figure 11A:
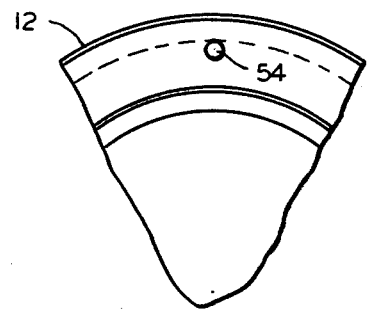
FIG. 11A is an end view of FIG. 11.

FIG. 11 of the drawing shows another embodiment of the invention which employs an O ring as the sealing member, such O ring being indicated by the character 28a. Various structures and relief openings may be used with the O ring embodiment but it is shown in FIG. 11 embodied in the same structure illustrated in FIGS. 1–5. FIG. 11A is a fragmentary end view of FIG. 11.

It will be understood in respect of FIGS. 8, 8A, 9, 9A, 10, 10A, 11 and 11A that there is another sealing member and relief opening in mirror image on the other side of the structure.

Figure 13:
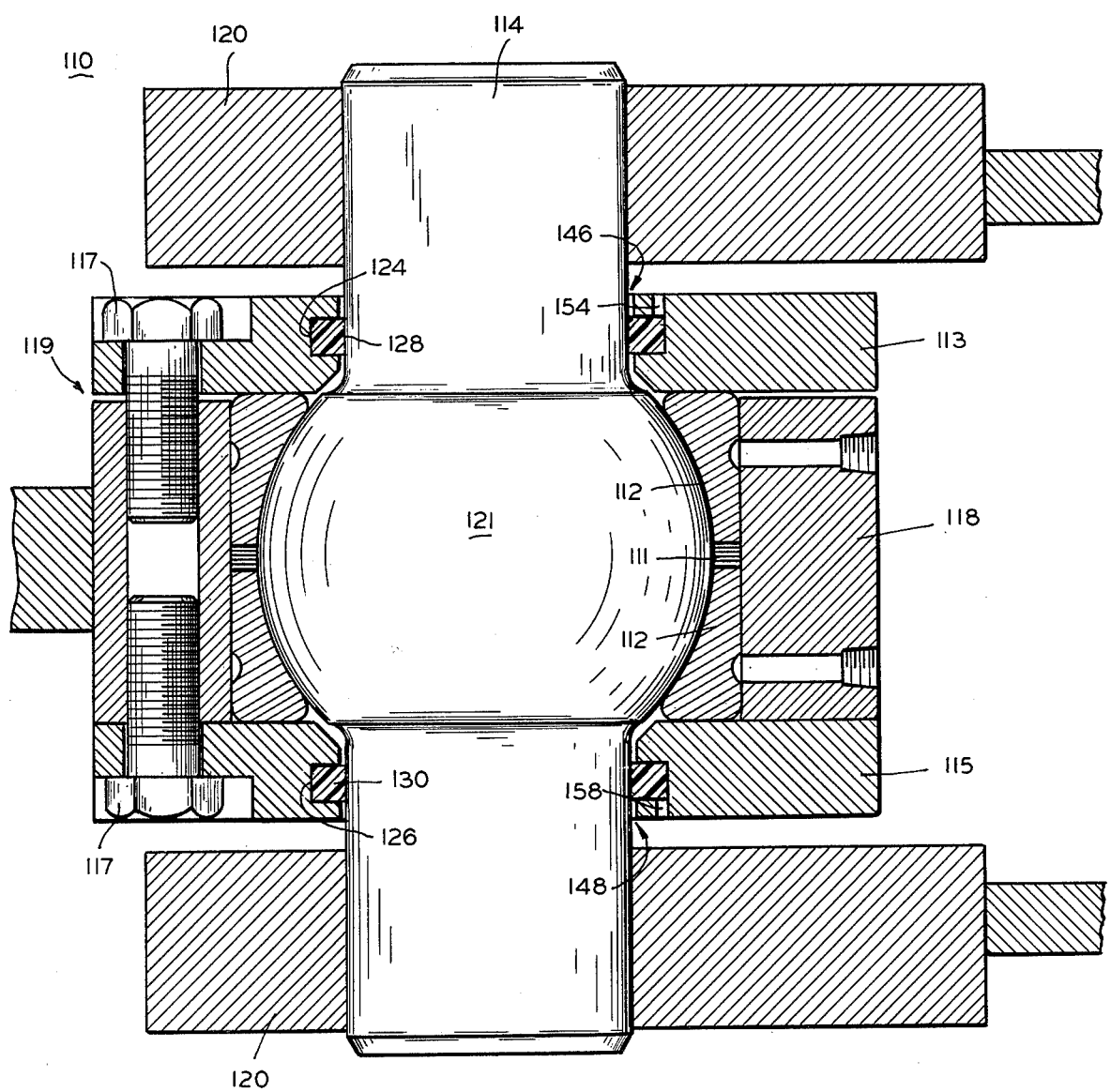
FIG. 13 shows a sixth embodiment.

FIG. 13 of the drawing shows another embodiment of the invention which is intended to be used in a vertical position and which includes a spherical portion on the pivot pin to enable the pivot joint to handle thrust or axial loads as well as radial loads. In FIG. 13 similar parts have been given the same numbers as the first embodiment except the prefix 1 has been added so that the identifying numbers are in the 100 series.

In FIG. 13 the pivot joint is indicated generally by the number 110 while the annular bushing is indicated by 112 and pivot pin by 114. The bushing 112 is composed of two separate parts with a shim pack 111 between them. The bushing 112 is retained within an outer member 118 while pin 114 is secured to a bifurcated or double member 120. In the embodiment of FIG. 13 the bushing member 112 is retained between two retainer members indicated at 113 and 115, such retainer members being secured together by a plurality of machine screws as illustrated at 117. The bushing 112, the shim pack 111, the outer member 118, the retainer members 113 and 115, and the machine screws 117 form an outer structure 119 corresponding to outer structure 19 of the first embodiment. It will be understood that the outer spherical surface 121 on pin 114 is one of the bearing surfaces while the inner spherical surface of bushing 112 is the mating bearing surface.

As shown in FIG. 13, the pivot joint 110 has two inward grooves 124 and 126 adjacent the upper and lower ends respectively of the outer structure 119 comprising retainers 113 and 115, member 118 and bushing 112. These grooves are rectangular in section and contain elastomeric sealing members 128 and 130 respectively. Relief openings 154 and 158 similar to the corresponding relief openings in the first embodiment, are provided for grooves 124 and 126 respectively. Diametral clearances 146 and 148 correspond to 46 and 48 in FIG. 3.

Various factors affect the tendency for sealing members to be extruded from a pivot joint of this type such as the amount of retainment provided for the sealing members by the inward flange portions of the outer structure, the amount of the diametral clearance or gap between the outer structure and the pin, the characteristics of the sealing members, the pressure at which the lubricant is inserted, and the composition of the lubricant. However, if the various factors are equal, the use the present invention provides substantial relief from the problem of extruding sealing members.

In a typical pivot joint according to the present invention the inside diameter of bushing 12 between the sealing members is 2.497–2.496 inches (63,424–63,399 mm.) while the inside diameter of the inward flange portions is 2.56 inches (65,0 mm). The outside diameter of the pivot pin 14 is 2.488–2.487 inches (63,195–63,170 mm).

The bushing and pivot pin preferably are made of hardened steel. The lubricant may be a petroleum base grease with a thickener of either lithium soap or an organic substance. The sealing members may be of closed cell expanded urethane, rubber, synthetic rubber or other equivalent material.

The sealing members preferably should be relatively soft, that is, have a low durometer reading, and in the best mode contemplated the durometer reading is 50 on the Shore Scleroscope A scale. Such softness is needed to allow the deformation of the sealing members to discharge lubricant as illustrated in FIG. 7, and also to facilitate assembly of the sealing members. Sealing members having higher durometer readings of 70 or more, such as are commonly used for static seals, may not be satisfactory because their stiffness may prevent the deformation illustrated in FIG. 7 and thus inhibit operation in accordance with this invention.

Figure 12:
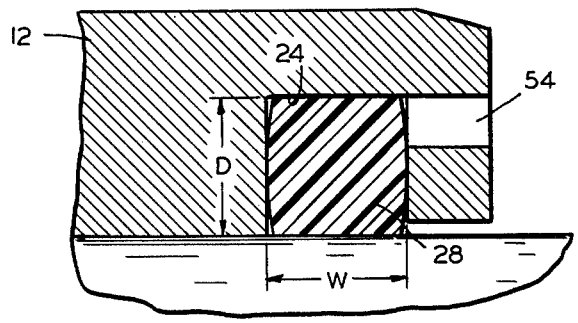
FIG. 12 is an enlarged fragmentary view of the upper right portion of FIG. 3.
Figure 12A:
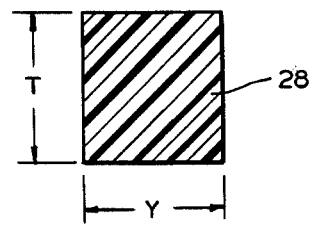
FIG. 12A shows a cross section of an uninstalled sealing member.

It is important also that the sealing members have the correct dimensions in relation to the grooves in which they are located. FIG. 12 of the drawing is an enlarged view showing a typical installation in accordance with this invention with the sealing member 28 in position in the groove 24, and before lubricant is inserted. In this figure the letter D indicates the depth of the groove and the letter W the width. FIG. 12A shows the sealing member before it is installed in the joint in the condition illustrated in FIG. 12; in FIG. 12A the character T represents the thickness or depth of the sealing member and Y represents the width of the sealing member in the uninstalled condition.

In the same typical joint referred to previously, the dimension T is 0.28 inches and dimension D is 0.251 inches. Thus, when the sealing member is installed in the groove it is squeezed or compressed, and in this particular case the reduction in depth or thickness amounts to approximately 10% of the original thickness of the sealing member. In the same joint the dimension Y of the sealing member is 0.25 inches while the dimension W of the groove is 0.26 inches. Thus, the cross-sectional area of the sealing member in such joint is slightly greater than the cross-sectional area of the groove. FIG. 12 illustrates in an exaggerated manner how the sealing member is compressed as to thickness when it is installed.

While I have described and illustrated herein preferred embodiments of my invention showing the best mode contemplated for carrying out such invention it will be appreciated that modifications may be made. Accordingly, it should be understood that I intend to cover by the appended claims all such modifications which fall within the true spirit and scope of my invention.

I claim:

1. A pivot joint comprising an outer structure having an opening for receiving a pivot pin, said outer structure including a bushing, a pivot pin located in said opening in bearing contact with said bushing, said pivot pin having a cylindrical portion means for retaining lubricant between said pin and said outer structure including an internal annular groove in said outer structure and an elastomeric sealing member retained in said groove in sealing relation with the cylindrical portion of said pin, said outer structure forming an annular gap with said pivotal pin axially outwardly of said annular groove and extending radially outwardly of said sealing member, and said outer structure including a relief opening extending from adjacent the outer diameter of said groove through said outer structure to the outside of the joint.

2. A pivot joint as in claim 1 in which said groove and said sealing member are in said bushing.

3. A pivot joint as in claim 1 in which said outer structure includes two retainer members located respectively at the ends of said bushing and said groove and sealing member are located in one of said retainer members.

4. A pivot joint as in claim 1 in which the thickness of the sealing member in the uninstalled condition is greater than the depth of the groove.

5. A pivot joint as in claim 1 in which said outer structure comprises an inward flange forming one side of said groove and said relief opening extends axially through said flange portion.

6. A pivot joint as in claim 1 in which said outer structure comprises an inward flange forming one side of said groove and in which said relief opening extends radially, connecting the outer diameter of said groove with a diametral gap between said pin and the inner margin of said flange.

7. A pivot joint as in claim 1 in which the said sealing member is rectangular in cross section.

8. A pivot joint as in claim 1 in which the said sealing member is circular in cross section.

9. In a pivot joint comprising an outer member having a circular opening therethrough for receiving a pivot pin, said outer member having an inward annular groove adjacent one end of said opening, a pivot pin located in said opening in bearing contact with said outer member, said pivot pin having a cylindrical portion, the pivot pin forming an outward annular gap with said outer member from said groove to said one end and extending radially outwardly into one wall of said groove, and an annular elastomeric sealing member retained in said groove in sealing relation with the outer surface of the cylindrical portion of said pivot pin, the improvement comprising a relief opening extending from adjacent the outer diameter of said groove through said outer member for reducing the likelihood of extruding said sealing member outwardly through said gap when lubricant is inserted under pressure into the joint between said outer member and said pin.

10. In a pivot joint comprising an outer structure having an opening therethrough for receiving a pivot pin, said outer structure including a bushing and two retainer members located respectively at the ends of said bushing, at least one of said retainer members having an inward annular groove therein, a pivot pin located in said opening in bearing contact with said bushing, said pivot pin forming an annular gap with said one retainer member between said groove and one end of said opening, and an annular elastomeric sealing member retained in said groove in sealing relation with the outer surface of said pivot pin, the improvement comprising a relief opening extending from said groove adjacent the outer diameter thereof through said one retainer member for reducing the likelihood of extruding said sealing member axially through said gap when lubricant is inserted under pressure into the joint between said outer structure and said pin.

* * * * *